Patented Apr. 12, 1949

2,466,998

UNITED STATES PATENT OFFICE 2,466,998

THERMOSET COPOLYMER OF VINYL CHLORIDE AND VINYLIDENE CHLORIDE

Thomas H. Rogers, Jr., Cleveland, Ohio, and Robert D. Vickers, New Rochelle, N. Y., assignors to Wingfoot Corporation, Akron, Ohio, a corporation of Delaware No Drawing. Application October 7, 1944, Serial No. 557,720

2 Claims. (Cl. 260—86)

This invention relates to valuable thermosetting resin compositions and to novel methods for their preparation. More specifically, it relates to copolymers containing one part by weight of vinylidene chloride and from three to nine parts by weight of vinyl chloride.

Copolymers of vinyl chloride and vinylidene chloride are well known in the art. Usually these copolymers are thermoplastic and are not capable of being cured to harder and stronger resins by subjection to elevated temperatures. Accordingly, the uses of these compositions are quite limited. It is apparent that methods of converting the thermoplastic materials into harder and stronger materials would greatly expand the utility of these resins. The prior art has used amino compounds to convert polyvinyl chloride and copolymers of polyvinyl chloride to harder and stronger resins, but such methods have produced compositions only slightly stronger than the thermoplastic raw material. It is the purpose of this invention to provide a method of converting vinyl chloride copolymers containing 10 to 25 percent of vinylidene chloride into more useful resins.

In a copending application, Serial No. 516,052, now U. S. Patent 2,438,097, filed by the same inventors on December 29, 1943, there are described and claimed methods of curing vinylidene chloride copolymers by the use of quaternary ammonium derivatives. It has now been discovered that, if the ammonium compounds are in chemical combination with acids, successful results can be achieved by using tertiary, secondary or even primary ammonium derivatives.

In the practice of this invention the new curing agents capable of successful use are the salts made by the inter-reaction of amines and acids as described hereinafter. Although the mechanism of the reaction is not fully understood, it is believed that the ammonium salts are gradually decomposed at the curing temperatures and the amines so produced are thereby made available for curing the vinylidene resin throughout the entire period of cure. Attempts to use the corresponding amines were unsuccessful apparently due to their volatility.

Suitable ammonium salts for the practice of the invention are the salts of acids which are capable of dissociation at temperatures between 200° and 400° F., such as the salts of formic, acetic, propionic, oleic, lauric, carbonic, oxalic, succinic, phthalic, lactic, benzoic, adipic, maleic, tartaric, carbamic, thiocarbamic, dithiocarbamic, salicylic acids, and mixtures of the above and similar acids, such as are derived by the decomposition of animal and vegetable oils. Generally carboxylic and thiocarboxylic acids may be used.

The above acids may be inter-reacted with organic bases, including the primary amines, such as methylamine, ethylamine, isopropylamine, cyclohexylamine and benzylamine, the secondary amines, such as dimethylamine, phenyl ethylamine, dibutylamine, dibenzyl amine and methyl ethylamine, the tertiary amines, such as trimethylamine, diethyl benzylamine, and ethyl diphenylamine, the N-heterocyclic amines, such as pyridine, piperidine, and morpholine and the guanidines, such as diphenyl guanidine and diethyl guanidine.

The ammonium salts which may be used as curatives are the compounds which contain one or more of the following molecular groupings:

wherein X is oxygen or sulfur and R is a hydrocarbon radical.

Of especial interest and activity are the cyclic ammonium derivatives, such as the salts of cyclohexylamine, pyridine, hexamethylene-imine and piperidine. A further desirable group of curing agents are the salts which contain a cyclic-substituted amide group.

Compounds having the following molecular structures are exemplary of the type of compounds operative in the practice of this invention:

(1) 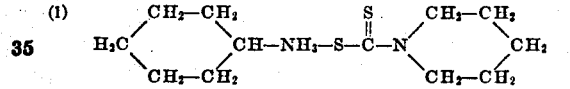

(2) 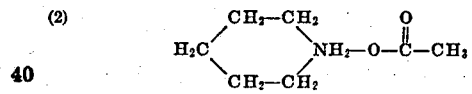

(3) 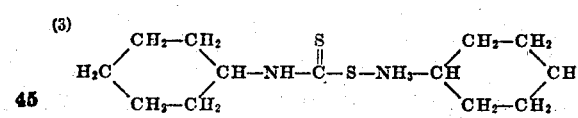

(4) 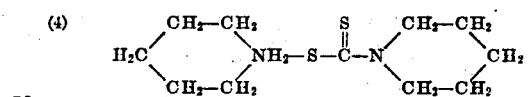

(5) 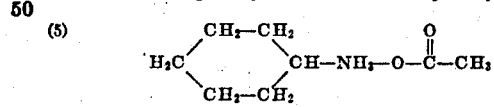

When copolymers, containing one part by weight of vinylidene chloride and from three to nine parts of vinyl chloride, are cured in the presence of organic ammonium salts, the tensile strength of the copolymer is very substantially increased. Usually, increases greater than 100 percent and frequently as high as 150 percent are experienced. Although any proportion of the ammonium salt may be used, usually one to 10 percent, and preferably two to six percent, are employed.

Attempts have been made to cure other polymers by identical methods and substantially different results were obtained. The use of heterocyclic amines in the curing of polyvinyl chloride produced a composition having about 20 percent greater tensile strength than the corresponding composition treated identically, except with the omission of the amine. In a large number of samples so treated, only one composition exceeded a 40 percent improvement, and that one was only 48 percent.

In accordance with the method of this invention, the vinyl-vinylidene copolymer is mixed with the ammonium salt and may also be mixed with phenolic resins, pigments, hydrogen acceptors and plasticizers. The mixing may be achieved in any conventional rubber machinery, such as a roll mill or a Banbury mixer. The mixture is worked until a uniform homogeneous composition is produced. Due to the thermoplastic nature of the principal constituent, such compositions are very soft and plastic, especially at temperatures between 100° F. and 400° F. The soft material is sheeted, or otherwise molded, into a desired shape and cured by heating at 200° F. to 400° F. for 20 to 60 minutes until the tensile strength of the copolymer is increased at least 50%.

Phenolic resins, particularly the solid phenol formaldehyde condensation products, known commercially as "thermosetting" or "B-stage" phenolics, may be used. These are available and sold commercially as molding resins. Generally, from two to fifteen percent of phenolic resin may be used, but from five to ten percent is preferred. By using a small proportion of the phenolic resin, a slightly higher tensile property is usually noted. A further benefit derived from the addition of phenolic resin lies in the fact that resin compositions so modified develop their tensile property after a shorter cure period and usually do not experience a material reduction in tensile strength upon a continued curing treatment. Accordingly, the dangers of over-curing are effectively avoided.

If desired, the new resin compositions may be modified by the incorporation of other materials without substantially affecting the desirable properties. Thus, the preferred compositions contain hydrogen acceptors, such as magnesium oxide, sodium carbonate, calcium oxide and magnesium carbonate, which may be added to the extent of 1 to 10 percent by weight for the purpose of preventing deterioration of the composition at elevated temperatures used in curing. Similarly, plasticizers such as dibutyl sebacate, methoxy ethyl oleate, and other plasticizers well known in the art, may be added in amounts up to 30 percent by weight of the entire composition, and preferably 10 to 35 percent of the weight of the copolymer. The uses of plasticizers are well understood by the art and the quantities and types to be used may readily be determined from a consideration of the uses to which the resins will be applied. From 1 to 10 percent of a pigment, such as carbon black, calcium silicate, zinc oxide and calcium carbonate may be used to fill the composition to develop colors or to improve physical properties after the manner well known to the prior art.

Further details of the manufacture of our new resins will be described with respect to the following specific examples:

EXAMPLE 1

A copolymer containing 85 percent of vinyl chloride and 15 percent of vinylidene chloride was mixed with 25 percent of dibutyl sebacate on a hot mill. After 15 minutes of mixing, five percent by weight of magnesium oxide was added and throughly mixed on a hot mill. Four percent (based on the weight of copolymer) of hexamethylene ammonium hexamethylene dithiocarbamate was thoroughly milled into the composition. After a uniform soft composition was obtained, it was separated into two portions. Into one of these portions ten parts by weight of zinc oxide were added and thoroughly mixed therein. Both compositions were sheeted out and cured at 290° F. At ten minute intervals, samples were removed and tested for tensile strength and elongation at the break point. The following results were obtained:

*Without zinc oxide*

| Time of Cure | Kg./cm.$^2$ | Per Cent Elongation |
|---|---|---|
| 10 | 110 | 265 |
| 20 | 120 | 220 |
| 30 | 122 | 250 |
| 40 | 123 | 190 |

*With zinc oxide*

| Time of Cure | Kg./cm.$^2$ | Per Cent Elongation |
|---|---|---|
| 10 | 106 | 285 |
| 20 | 140 | 300 |
| 30 | 143 | 265 |
| 40 | 148 | 200 |

These physical properties demonstrate that the new catalysts promote a rapid cure to the optimum tensile strength and that no reduction in tensile property is noticeable after being subjected to curing temperatures for 40 minutes.

EXAMPLE 2

The procedure of Example 1 was repeated except that cyclohexylamine cyclopentamethylene dithiocarbamate was used as the curing agent. The composition was pigmented with ten parts by weight of zinc oxide. The following excellent physical properties were obtained:

*With zinc oxide*

| Time of Cure | Kg./cm.$^2$ | Per Cent Elongation |
|---|---|---|
| 10 | 132 | 260 |
| 20 | 162 | 280 |
| 30 | 164 | 260 |
| 40 | 180 | 275 |

EXAMPLE 3

The procedure of Example 1 was repeated except that piperdinium acetate was used as the curing agent. Ten parts by weight of zinc oxide were also used. The following physical properties were measured:

*With zinc oxide*

| Time of Cure | Kg./cm.² | Per Cent Elongation |
|---|---|---|
| 10 | 130 | 245 |
| 20 | 149 | 245 |
| 30 | 148 | 225 |
| 40 | 166 | 240 |

EXAMPLE 4

As a control to show the effect of heat on the vinylidene chloride copolymer which does not contain the organic ammonium salt, the procedure was duplicated on stock which did not have any curing agent incorporated therein.

| Time of Cure | Tensile Kg./cm.² | Per Cent Elongation |
|---|---|---|
| 10 | 44 | 200 |
| 20 | 52 | 250 |
| 40 | 58 | 250 |
| 60 | 56 | 250 |

The new compositions may be used as substitutes for natural or synthetic rubber, since they may be calendered, molded, milled, or otherwise compounded in the usual rubber machinery. Accordingly, heels, shoe soles, tires, inner tubes, electrical insulation, tubing, belts, gaskets, and other articles requiring a tough and resilient composition, may be fabricated.

In this specification, the expressed percentages of amine, phenolic resin, and other modifying components are based upon the copolymer content unless otherwise expressed.

Although the invention has been described with respect to specific detailed examples, it is not intended that such details shall be limitations on the scope of the invention except as incorporated in the following claims.

We claim:

1. A method of preparing a thermoset copolymer of 75 to 90% by weight of vinyl chloride and from 25 to 10% of vinylidene chloride which comprises incorporating in the copolymer from 1 to 10% by weight of hexamethylene ammonium hexamethylene dithiocarbamate and subjecting the copolymer to a temperature between 200° F. and 400° F. until the tensile strength of the copolymer is increased at least 50%.

2. A method of preparing a thermoset copolymer of 85% vinyl chloride and 15% vinylidene chloride which comprises incorporating in the copolymer 4% by weight of hexamethylene ammonium hexamethylene dithiocarbamate and subjecting the copolymer to a temperature of 290° F. for a period of between 10 minutes and 40 minutes.

THOMAS H. ROGERS, JR.
ROBERT D. VICKERS.

REFERENCES CITED

The following references are of record in the file of this patent:

UNITED STATES PATENTS

| Number | Name | Date |
|---|---|---|
| 2,103,581 | Gray | Dec. 28, 1937 |
| 2,190,776 | Ellingboe et al. | Feb. 20, 1940 |
| 2,245,742 | Alexander et al. | June 17, 1941 |
| 2,270,662 | Raney | Jan. 20, 1942 |
| 2,304,637 | Hardy | Dec. 8, 1942 |
| 2,336,792 | Langkammerer et al. | Dec. 14, 1943 |
| 2,405,008 | Berry et al. | July 30, 1946 |